US006341368B1

(12) United States Patent
Deans

(10) Patent No.: US 6,341,368 B1
(45) Date of Patent: Jan. 22, 2002

(54) METHOD AND SYSTEMS FOR CREATING MULTI-INSTANCED SOFTWARE WITH A PREPROCESSOR

(75) Inventor: Scott Deans, Raleigh, NC (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 08/984,167

(22) Filed: Dec. 3, 1997

Related U.S. Application Data
(60) Provisional application No. 60/056,634, filed on Aug. 22, 1997.

(51) Int. Cl.$^7$ .................................................. G06F 9/45
(52) U.S. Cl. ............................................ 717/1; 717/10
(58) Field of Search ........................... 395/701, 500.41, 395/706, 707, 708, 710, 825; 710/64, 5; 717/1, 6, 7, 8, 10, 5; 703/20

(56) References Cited

U.S. PATENT DOCUMENTS

| 4,667,290 | A | * | 5/1987 | Goss et al. ..................... 717/7 |
| 5,146,594 | A | * | 9/1992 | Iitsuka ........................... 717/8 |
| 5,339,419 | A | * | 8/1994 | Chan et al. .................... 717/7 |
| 5,381,550 | A | * | 1/1995 | Jourdenais et al. ............ 717/6 |
| 5,613,120 | A | * | 3/1997 | Palay et al. ................... 717/10 |
| 5,790,895 | A | * | 8/1998 | Krontz et al. ................. 710/64 |
| 5,812,820 | A | * | 9/1998 | Loram ........................... 703/20 |
| 5,812,852 | A | * | 9/1998 | Poulsen et al. ................ 717/6 |
| 5,864,710 | A | * | 1/1999 | Sands et al. ................... 710/5 |

FOREIGN PATENT DOCUMENTS

| EP | 0 416 768 A2 | * | 3/1991 | ............. G06F/9/46 |
| WO | WO 99/10807 | * | 3/1991 | ............. G06F/9/46 |

* cited by examiner

Primary Examiner—Tuan Q. Dam
Assistant Examiner—Hoang-Vu Antony Nguyen-Ba
(74) Attorney, Agent, or Firm—Skjerven Morrill MacPherson LLP

(57) ABSTRACT

A pre-processor is utilized to create multi-instantiated code from single instance code so that multiple copies of the single instance code can be run without changing the source code of the single instance code. Exemplary implementations include modems running multi-instantiated code, for example in a protocol stack or in a data link control element. Multiple instances of entire modem code set(s) or of portions of a modem code set can be run on the processor of a modem or on a host processor of a software modem. Another application permits a processor having no memory management unit to operate as if it had one. Another implementation enables a single task operating system, such as DOS, to run as a multi-task system. This document describes a simple method of converting ordinary single-instance software into software that supports multiple instances, each with its own data, running simultaneously on a system. This method enables multiple instance support WITHOUT modifying the original functions in the source code.

17 Claims, 12 Drawing Sheets

METHOD AND SYSTEMS FOR CREATING MULTI-INSTANCED SOFTWARE WITH A PREPROCESSOR

CROSS-REFERENCES TO RELATED APPLICATIONS

This application claims priority from provisional patent application Ser. No. 60/056,634 filed Aug. 22, 1997, entitled CREATING MULTI-INSTANCED SOFTWARE EFFORTLESSLY WITH THE PREPROCESSOR which is incorporated herein by reference in its entirety.

BACKGROUND OF THE INVENTION

1. Field of the Invention

The invention relates to computer technology and, more particularly, to creating multiple-instance software from single-instance source code utilizing a compiler's preprocessor.

2. Description of Related Art

Most software is written to use a "single instance", which means that it is designed to run only one copy of the program and its data at a given time on a single system. Some other software can be shared by more than one "client" program at a time, allowing each client to run a copy of the program with its own set of data. This software can be called "multi-instanced", in that more than one "instance" of the code can be running at one time.

A good example of multi-instanced software is that of a Windows DDL (Dynamically-Linked Library), which can be shared among many programs at once. A Dynamically-Linked Library (or DLL) is a collection of program functions and data in the Microsoft Windows software architecture. On its own, a DLL performs no useful function, as it is merely a library of code that is linked together into one single unit, or file, on a computer's magnetic storage medium. Client applications running on a Windows system can dynamically load these libraries into computer memory and access the program functions contained therein. A DLL uses the client application's data space to hold its data, so the DLL is able to keep each client program's data separate from the data of other client programs. That approach, however, requires operating system support to manipulate the data segments and keep track of which process owns the data. It also requires each client's copy of the DLL's data to exist in a different "data segment". A data segment is a section of computer memory that is reserved by the operating system for exclusive use by a client program. Intel architecture microprocessors provide support for manipulating data segments via the DS hardware register.

In the prior art, when one wished to change software from single instance to handle multiple instances, a complete redesign of the software was required. This caused many problems. First, significant training was required of customer personnel in order to understand and utilize the redesigned software. Further, it was expensive to maintain because maintenance personnel would have to be conversant with two versions of the software; that is one version would be a single instance version and the other would be a multiple instance version. Further, when running the software, plural copies of the code would typically run, each having its own data which produced a substantially redundant situation. Thus, it would be desirable if the same code could be used for single-instance and multi-instance implementations. Further, it would be desirable if only one copy of the code were running which would service all of the instances needed.

SUMMARY OF THE INVENTION

In accordance with the invention, single-instance software is converted into software that supports multiple instances, each with its own data, running simultaneously on a system. The approach enables multiple instance support without modifying the original source code. This is preferably done at compile time using the preprocessor.

Also in accordance with the invention, modems or computers run a multi-instantiated modem code set(s) or portions of a modem code set, such as a protocol stack or data link control element.

Also in accordance with the invention, a processor having no memory management unit is enabled to operate as if it had one.

Also in accordance with the invention, a single task operating system, such as DOS, is enabled to run as a multi-task system.

When multiple instances of the same piece of code are running, only one copy of the code need be resident in memory. However, by changing instances, one can create a global change in behavior of the currently executing software without changing the source code.

DESCRIPTION OF THE PREFERRED EMBODIMENTS

Figure 1A:
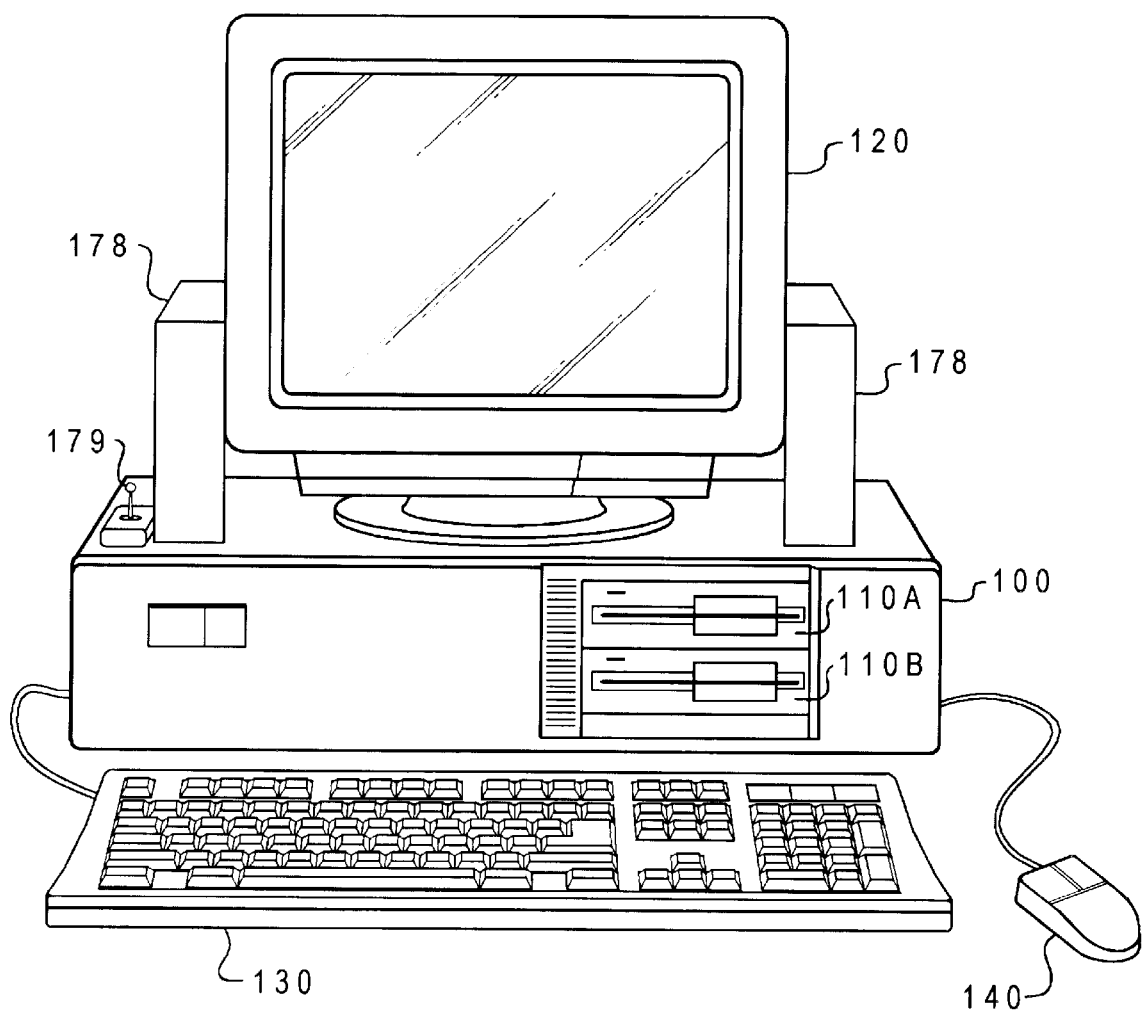
FIG. 1A is a view of exemplary computer system suitable for use in carrying out the invention.

FIG. 1A illustrates a computer 100 of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. This computer is also audio equipped with speakers 178 and a microphone 179.

Figure 1B:
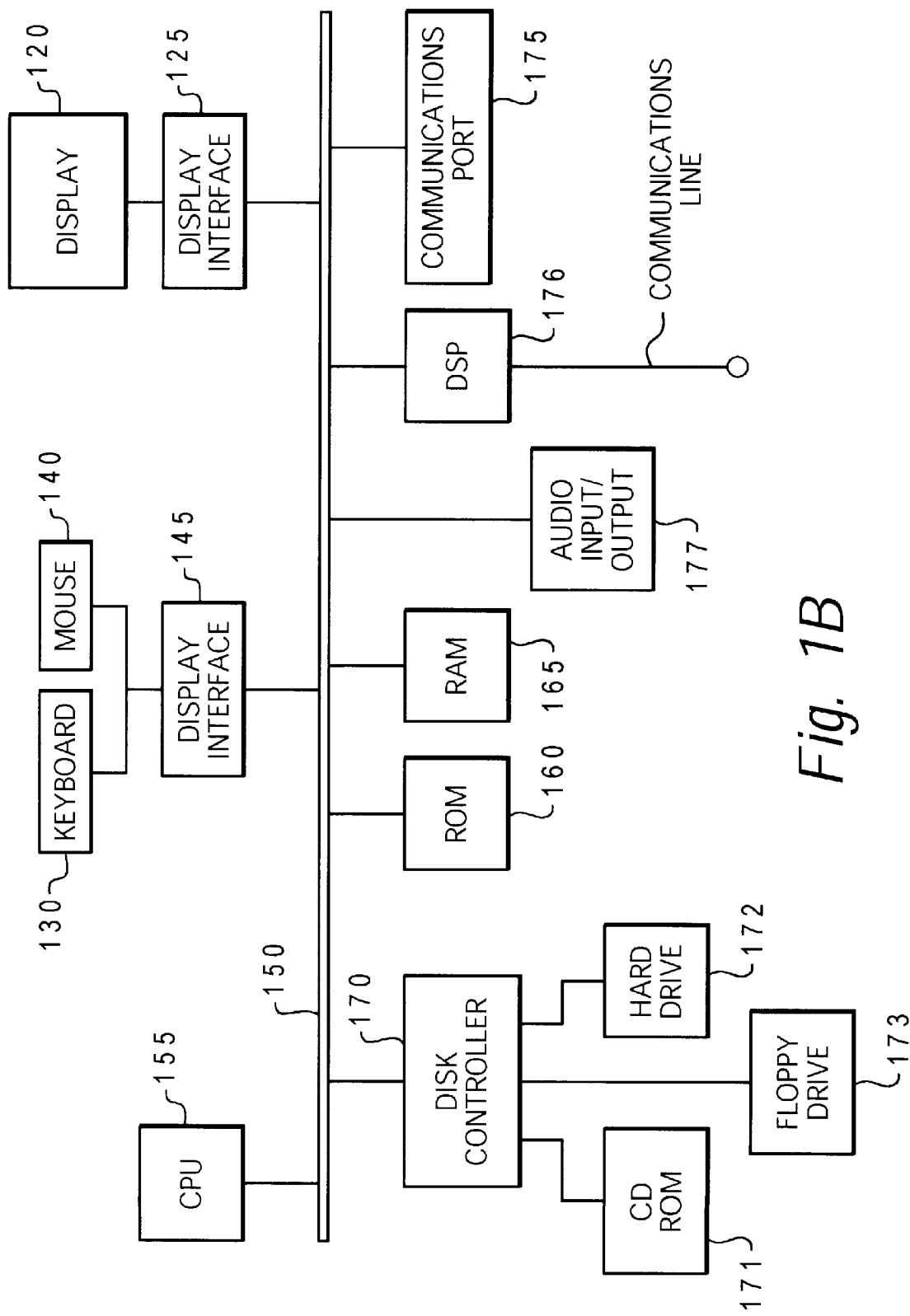
FIG. 1B is a block diagram of an exemplary hardware configuration of the computer of FIG. 1.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 125 interfaces a display 120 and permits information from the bus to be viewed on the display. Communications with external devices can occur over communications port 175. Computer 100 also has an audio input/output interface 177 for audio communications and a digital signal processor 176 which provides a hardware interface to a communications line and which can function as an output interface for a modem.

Figure 1C:
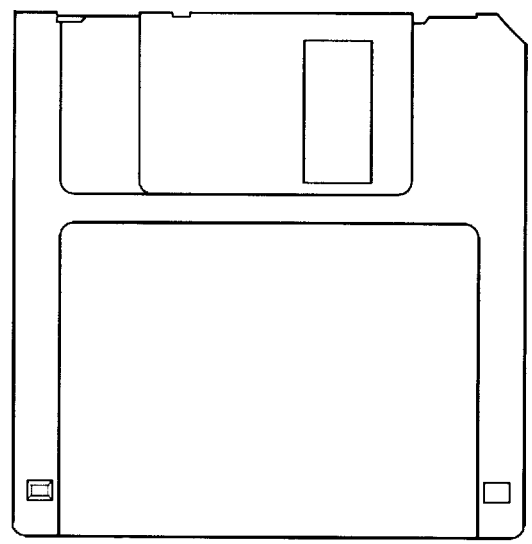
FIG. 1C is an illustration of an exemplary memory medium suitable for storing program and data information in accordance with the invention.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain program and data information as described more fully below for controlling the computer to enable the computer to perform its multi-instanced functions in accordance with the invention.

Figure 1D:
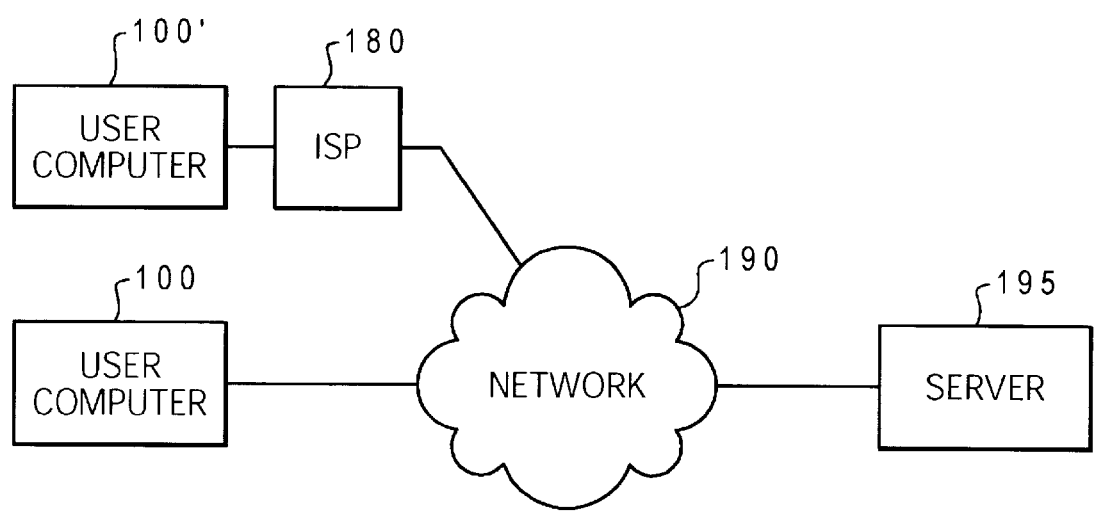
FIG. 1D is a block diagram of a network architecture suitable for carrying data and programs in accordance with some aspects of the invention.

FIG. 1D is a block diagram of a network architecture suitable for carrying data and programs in accordance with some aspects of the invention. A network 190 serves to connect a user computer 100 with one or more of a plurality of servers such as server 195. Servers provide various services, such as the download of program and data information. Users such as user 100', may also connect to the network by way of a network service provider such as ISP 180. A server such as 195 can download program and data information needed for carrying out the invention to users 100 over network 190.

Figure 2:
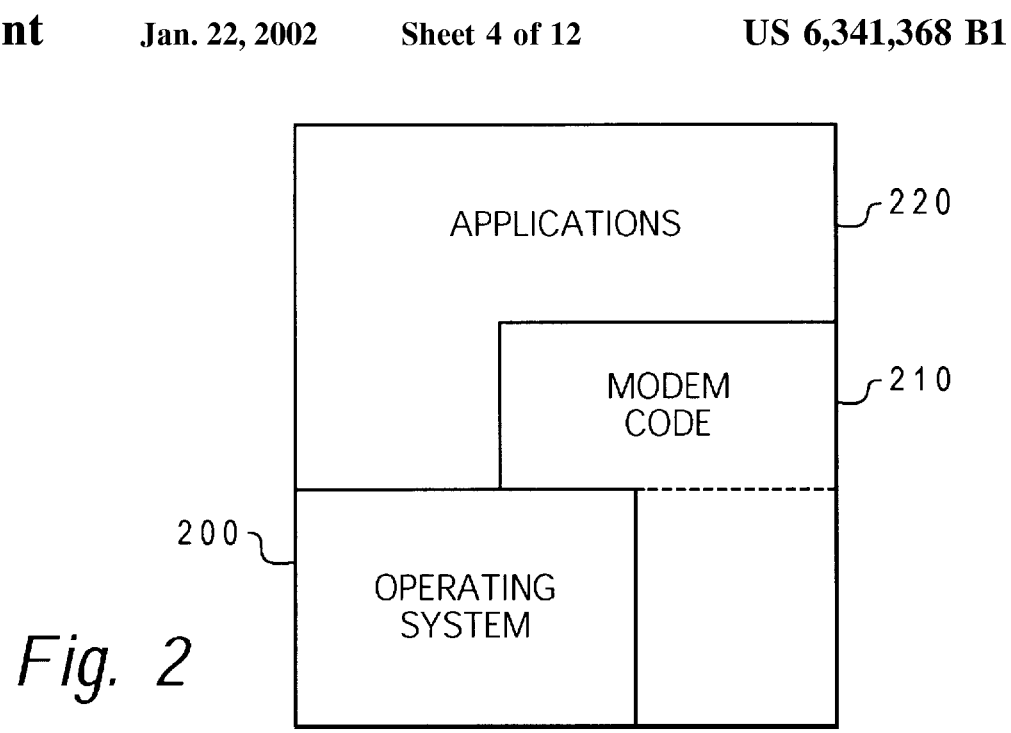
FIG. 2 illustrates an exemplary software architecture suitable for use in carrying out the invention.

FIG. 2 illustrates an exemplary software architecture suitable for use in developing multi-instanced software in accordance with the invention. Typically, computer 100 has an operating system 200. In the example shown, it also has code for running a modem, in this case, a software modem 210. Applications 220 utilize the services of the operating system and the modem code in carrying out their functionality. Modem code 210 may utilize services of the operating system in order to access external devices or may bypass the operating system and access external devices directly. This will depend upon the implementation. Accordingly, the dashed line indicates that the modem code utilizes the services of the operating system or, when it does not, the dash line is treated as not there, indicating the modem code bypasses the operating system. It is possible for the modem to partially bypass and partially utilize services of the operating system, depending upon a particular implementation.

Figure 3:
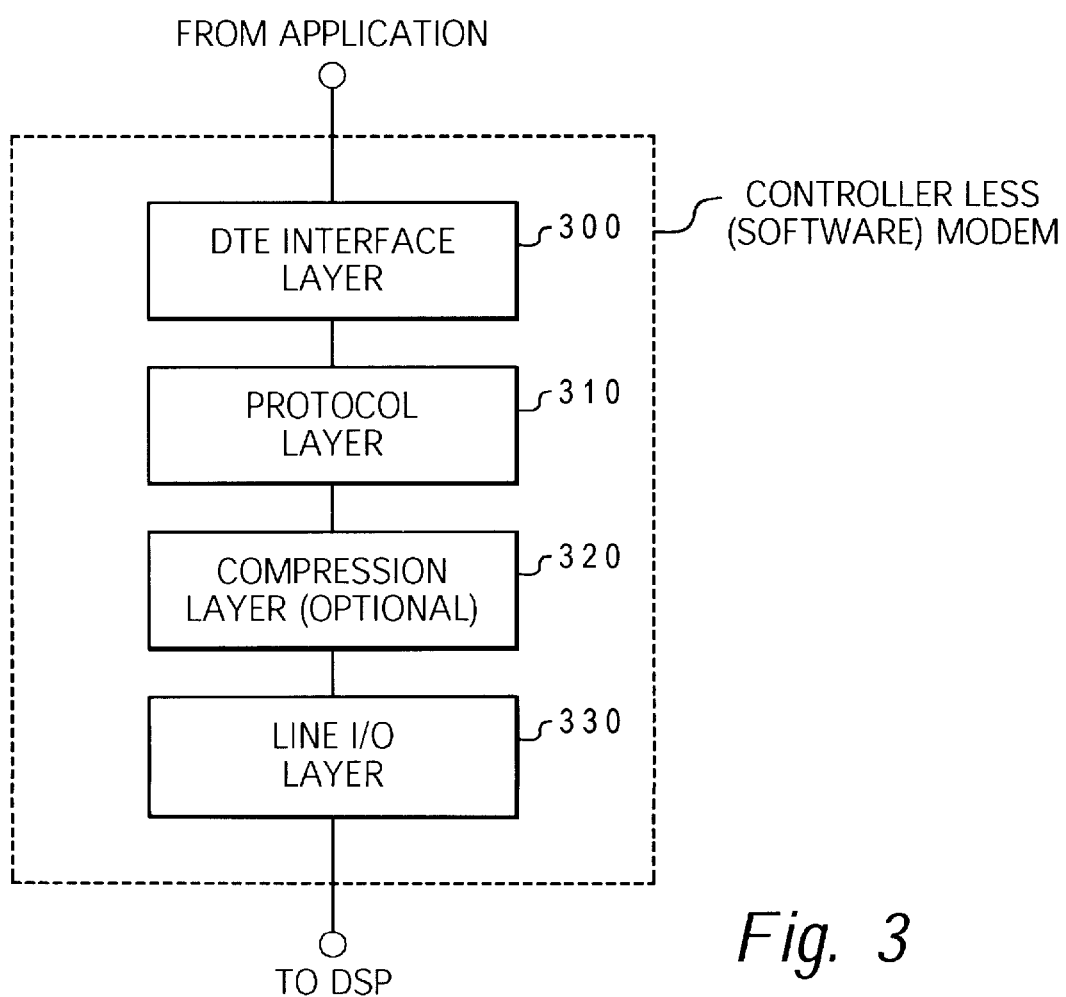
FIG. 3 is a block diagram of exemplary modem software suitable for use in carrying out the invention.

FIG. 3 is a block diagram of exemplary modem software for multi-instanced implementation in accordance with the invention. The applications interface with a DTE interface layer 300 which manages the interaction with the computer. A protocol layer 310 receives information from the data interface layer and formats it in accordance with a particular protocol in use. An optional compression layer 320 may be utilized to compress the data prior to passing it to the line I/O layer 330 which interfaces the higher layers with a digital signal processor 176 which serves as the hardware interface to a communications line. Note that in the examples shown, the software layers 300, 310, 320 and 330 together constitute a software modem and are run, in a preferred embodiment, on the host. In some embodiments, there are two software modules that interface with the DSP hardware. The Modem Control Layer, or "modem task", manipulates DSP modes, creates and destroys modem connections, and monitors modem activity. The Line I/O Layer is responsible for transferring data to and from the DSP. Alternatively, the software shown in FIG. 3 can be run on a modem having a dedicated processor. Modems of the latter type are found, typically, in internal modem line cards in computer devices and as stand-alone modems which connect externally to a computer.

Figure 4:
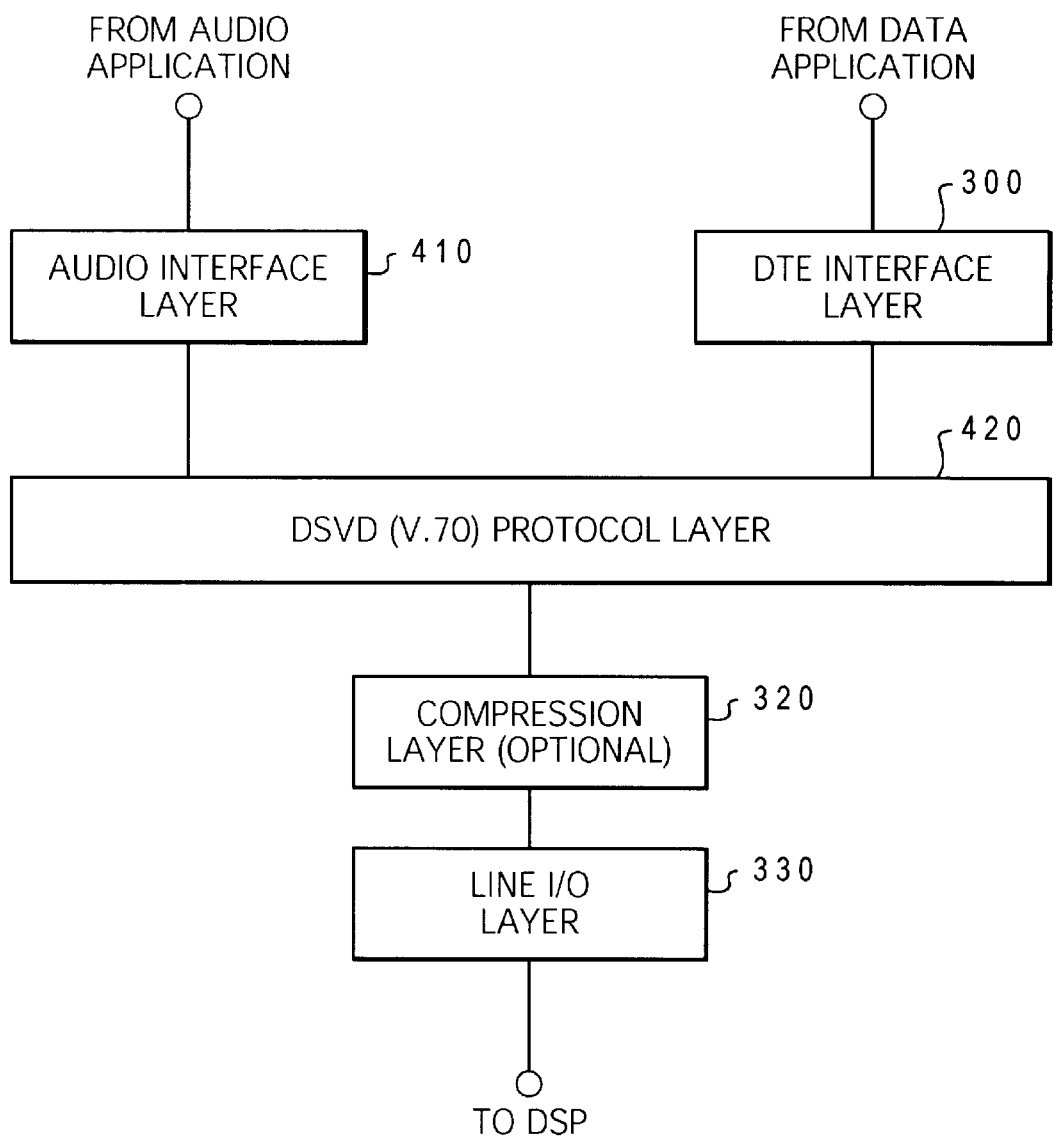
FIG. 4 is a block diagram of a modification of exemplary software of FIG. 3 for carrying out an exemplary implementation of Digital Simultaneous Voice and Data (DSVD (V.70)).

FIG. 4 is a block diagram of a modification of exemplary software of FIG. 3 for carrying out an exemplary implementation of Digital Simultaneous Voice and Data (DSVD (V.70)). When a modem is configured to handle DSVD in accordance with the recommendation V.70, there are two source interfaces. The first is a DTE layer 300 which receives data from an application before transmission over a communications line. An audio interface layer 410 receives audio from an application for transmission over the communication line as well. Recommendation V.70 specifies standards for the implementation of this functionality. However, implementations are left to the individual vendors. The DSVD layer, 420 manages the audio and data information as it is transmitted over a communications link. This is described in more detail hereinafter.

Figure 5:
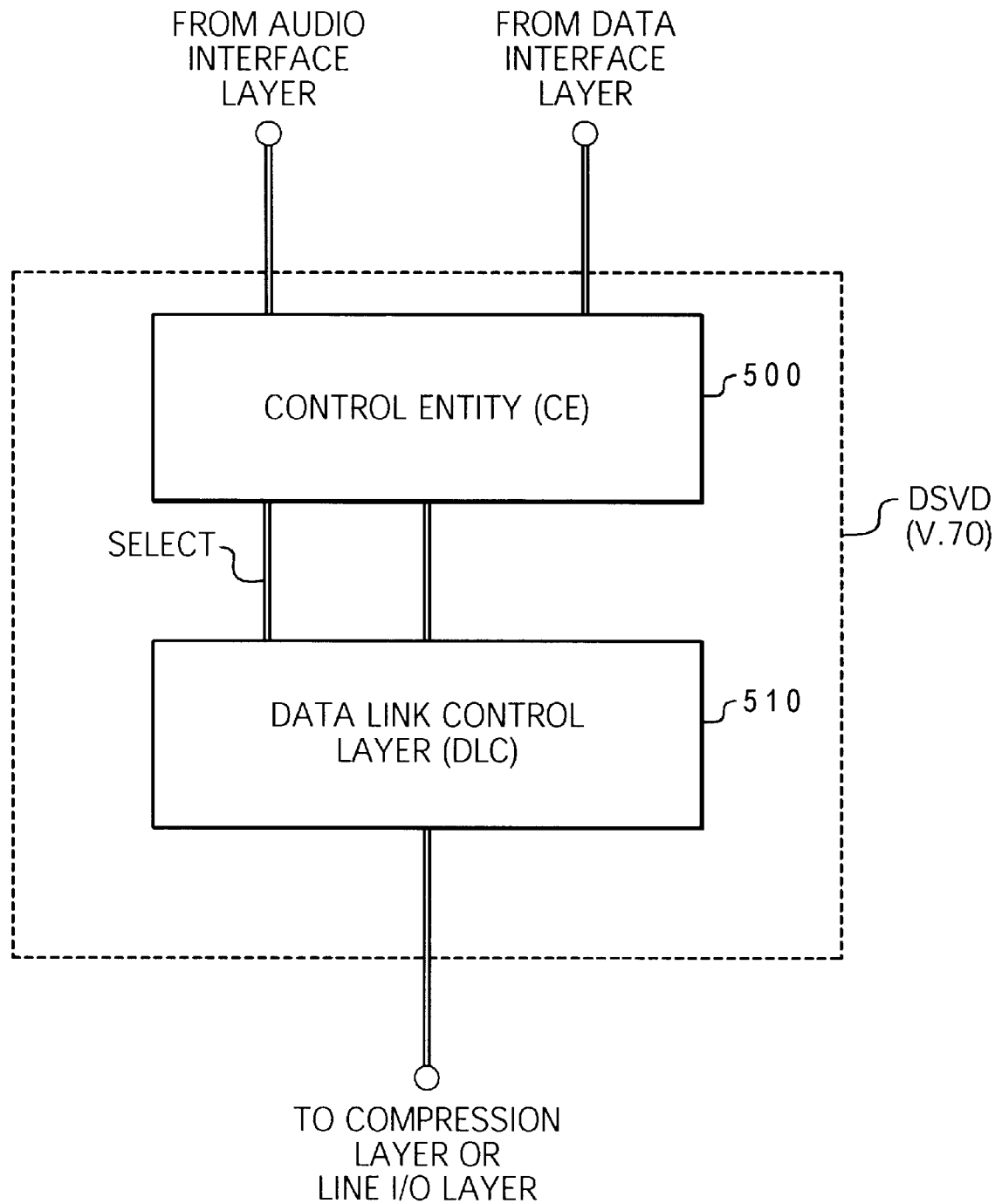
FIG. 5 is a block diagram showing more details of the DSVD (V.70) layer of FIG. 4.

FIG. 5 is a block diagram showing more details of the DSVD (V.70) layer of FIG. 4. There are two entities specified in the DSVD (V.70) Recommendation. One is a control entity 500 and the second is a data link control layer (DLC) 510. The control entity 500 manages the input/output from the data interface layer and the audio interface layer. It also passes information over the select line to the data link control layer indicating the source of the information arriving. The data link control layer manages data formatting using, in this case, link access protocol, LAPM. Since the line access protocol is substantially the same for each source, one needs to have two processes running, one for the audio and one for the data. If the data link control layer were implemented, using techniques of the prior art, there would be two separate versions of the LAPM code running, one for audio and one for data. However, in accordance with one aspect of the invention, what would otherwise be single instance LAPM code is converted to multi instance software with several attendant advantages. The advantages include having only one version of the code running while being able to simultaneously serve the separate needs of the audio and data sources. How this is done is explained in more detail hereinafter. In some implementations there may be multiple control entries with the selection of data to be sent being handled by the data link control layer.

Figure 6:
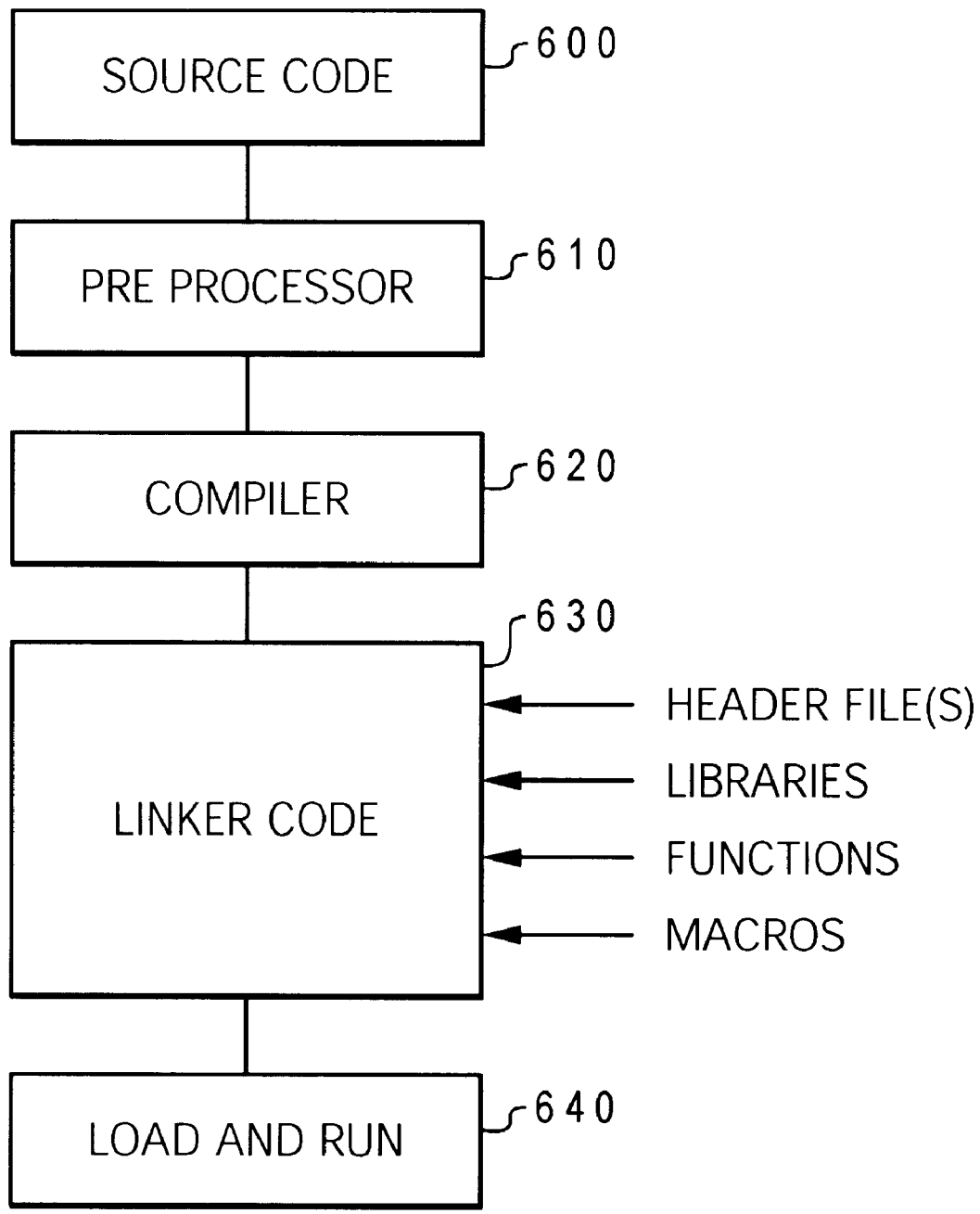
FIG. 6 is a block diagram of processing typically undertaken to compile, link, load and run source code.

FIG. 6 is a block diagram of processing typically undertaken to compile, link, load and run source code. Source code, shown symbolically at block 600 is run through a preprocessor 610 in the normal course of compiling an application. Once it has been preprocessed, the preprocessor output is applied to compiler 620 resulting in object code. The object code from the compiler is then linked (630) with header files, libraries, functions and macros to produce the final executable code which can be loaded and run as shown at 640.

Figure 7:
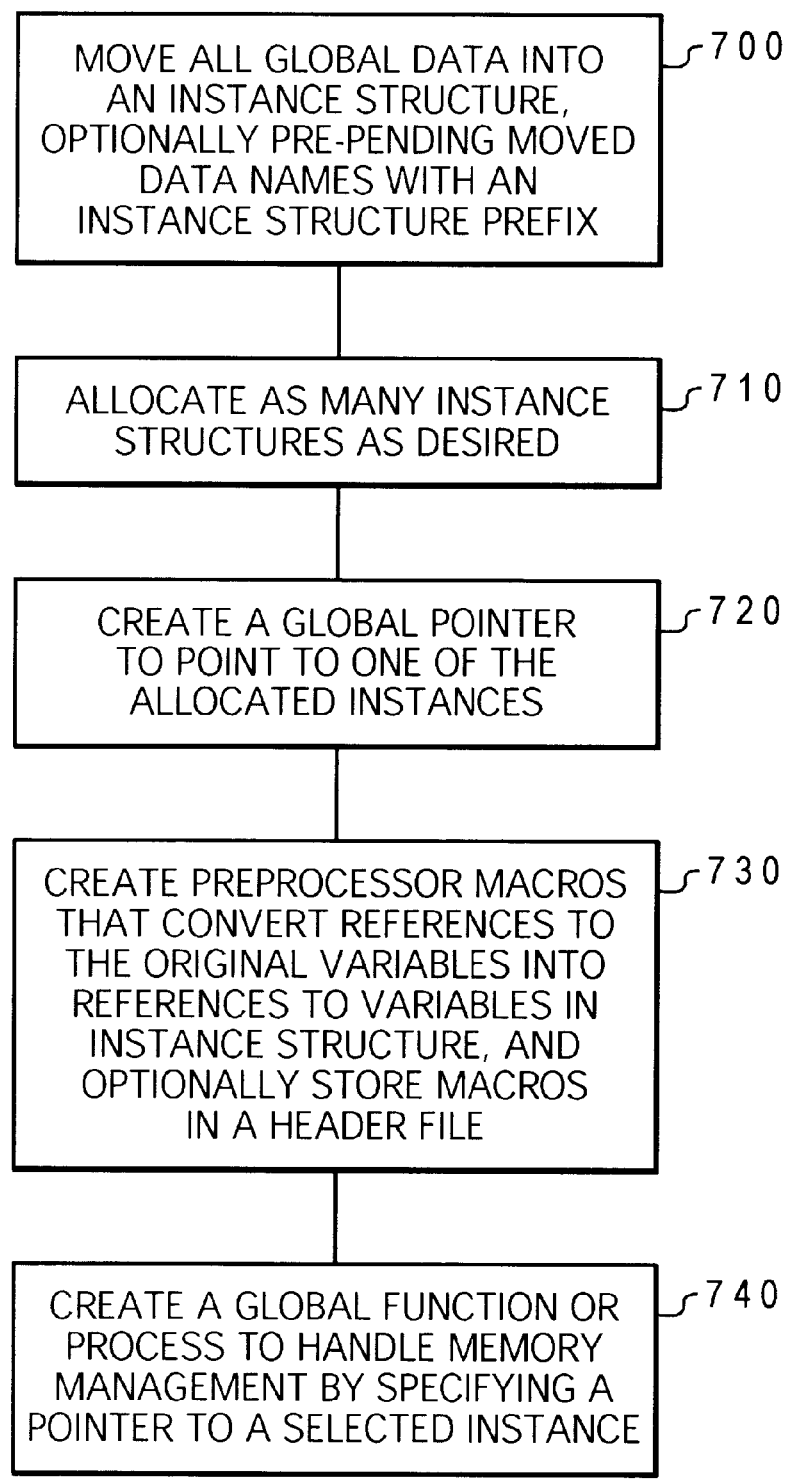
FIG. 7 is a flow chart of a process for creating multi-instanced software from single instance source code using the preprocessor.

FIG. 7 is a flow chart of a process for creating multi instanced software from single instance source code using the preprocessor. The single instance source code which one desires to convert to multi-instance source code is managed as follows: First, one moves all global data from the source code into an instance structure, optionally prepending moved data names with an instance structure prefix (700). Essentially, one creates a template data structure which serves as a model for a plurality of instance data structures. As many instance data structures as desired are allocated (700) and a global pointer is maintained to point to one of the allocated instances (720). The global pointer is used, when running an application, to specify the particular one of the allocated instances which is to be active for processing at that point in time.

One or more preprocessor macros are created to convert references to the original variables into references to variables in the instance structure (730). These macros can be conventionally stored in a header file. Thus, when preprocessing source code, references to the original variables are converted into references to the variables in a particular instance structure. A global function or macro is created to handle memory management by specifying a pointer to a selected or active instance (740).

This is done in the preprocessor 610 prior to compilation at 620.

An example may help clarify the operation of the process shown in FIG. 7.

Consider the following program.

---

Before

```
/* Sample program before applying invention techniques */
#include <stdio.h>
/* Function prototype */
void ShowInfo (void);
/* Global data */
int age;
char name[64];
/* Target function */
void ShowInfo (void)
{
    printf ("My name is %s.\n", name);
```

-continued

```
    printf ("My age is %d.\n", age);
}
/*
 * Main program code.
 *
 * This simple program will repeat the call to ShowInfo()
 * until the program is terminated.
 */
main ()
{
    while (1)
    {
        ShowInfo()
    }
}
```

In the example above there are only two variables, namely name and age. "Age" is a global integer and "name" is a global string. The program does a loop by which the sentences "My name is __. My age is __." are repeated continuously. Although this is not a useful program, it serves to illustrate in a simple fashion the power of the approach described in conjunction with FIG. 7.

When the program is modified in the preprocessor in accordance with the invention, all data is placed in a data structure __"person."

The following "after" program results. This "after" program has had coniments added referring to FIG. 7 of the drawings which explains what portion of the code results from the processing steps.

---

After

```
/* Sample program using invention techniques */
#include <stdio.h>
/* Function prototype */
void ShowInfo (void);
/* STEP 1: Move all global data into a new structure
    (called the instance structure). Prepend the
    original data items with the 'i_' prefix (or ANY
    other prefix desired) to help distinguish the items
    as instance data items.
    Prepending the data items is not required and is
    included simply to help distinguish instance data
    from other global data.
 */
/* Structure definition */
typedef struct _personstruct
{
    int i_age;
    char i_name [64];
} PERSONINFO;
/* STEP 2: Allocate as many of these instance structures
    as the program requires. In this case, a constant
    NUM_PERSONS is used to represent the number of
    structures to allocate.
    Use of a #defined constant is not required.
 */
/* Global data */
#define NUM_PERSONS 20
PERSONINFO person[NUM_PERSONS] = {0};
/* STEP 3: Create a global pointer to this new instance
    structure. This pointer will later be assigned to point
    to one of the allocated instance structures.
 */
PERSONINFO *p;
/* STEP 4: Create preprocessor macros that convert
    references to the original data variables into references
    to the new variables within the new instance structure.
 */
#define name      p->i_name
```

-continued

```
#define age          p->i_age
/* STEP 5: Create a simple global entity that will handle
the memory management for the different instances. This
function or macro only needs to point the instance
pointer ('p' in this example) to the address of one of
the allocated structures.
*/
#define SET_PERSON(i)    p = &person[i];
/* Target function - UNCHANGED */
void ShowInfo (void)
{
    printf ("My name is %s.\n", name);
    printf ("My age is %d.\n", age);
}
/*
 * Main program code.
 *
 * This simple program will repeat the call to ShowInfo()
 * until the program is terminated. During each loop, it
 * will change the data instance to a new instance, so
 * the information for a different 'person' is displayed
 * each time.
 *
 * Although this program does very little useful work, it
 * serves to demonstrate the simplicity and power of the
 * invention. In this case, there is only one function
 * used (ShowInfo) to demonstrate that the original
 * function does not need to change in any way to support
 * multiple instances. Using the invention techniques,
 * there could be ANY number of functions in the program
 * using multiple instances, and none of them would need
 * to change to support multiple instances.
 *
 * There is also no limit to the number of data items and
 * data types that can be included in a program's
 * instance structure. In this case, there are only two
 * data items in the instance structure, but there could
 * be ANY number of different items in a program's
 * instance structure.
 *
 * Only a small amount of work needs to be done to make
 * all of the program's global data work with multiple
 * instances.
 */
main ()
{
    int which_person = 0
    while (1)
    {
        /* Switch data instances */
        SET_PERSON(which_person);
        /* Target function - UNCHANGED */
        ShowInfo();
        /* Move on to the next person, wrapping to zero at
           the end of the list. */
        which_person++;
        if (which_person == NUM_PERSONS)
            which_person = 0;
    }
}
```

Figure 8:
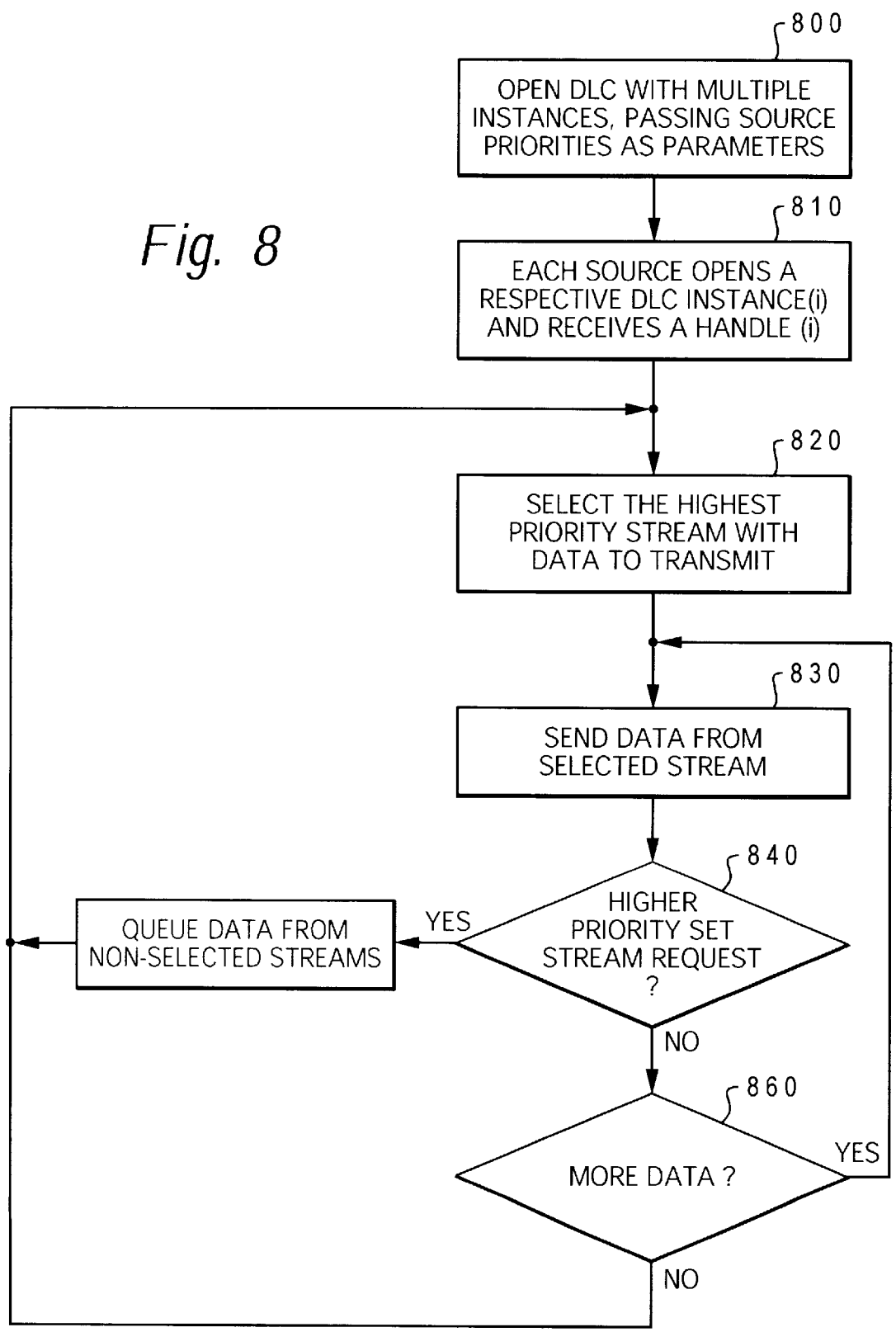
FIG. 8 is a flow chart of a process for using multi-instanced software to implement a DLC layer of a controllerless modem using DSVD (V.70).

FIG. 8 is a flow chart of a process for using multi-instanced software to implement a DLC layer of a controllerless modem using DSVD (V.70). A single instance implementation of the LAPM code was processed as discussed in conjunction with FIG. 7 to create a multi-instanced version of that code utilizing the preprocessor. That means that maintenance personnel would not have to learn new code. It also means that only one copy of the code would be running. Additional instances of the code would only require data space. The multi-instanced version of the DLC would be opened with multiple instances, passing source priorities as parameters to the DLC module (800). Each source (audio or data in this example) would open a respective DLC instance (i) and receive a handle with which it would refer to that instance (810). The stream with the highest priority (in V.70, audio has priority over data) will be selected and the appropriate instance rendered active (820). Data would be sent from the selected stream (830) and, periodically, a check made to determine whether or not a higher priority set stream request had been received (840). If a higher priority set stream request had been received, the data from the non-selected streams would be queued pending availability (at that level of priority) of the output channel. If the existing source is not preempted by a higher priority set stream request (840-N), more data would be sent until all data from that stream ready for transmission had been sent (860-Y). If there is no more data (860-N), the next highest priority stream having data to transmit will be selected (820) and the process repeats. Thus, single instance software can be utilized intact, using the techniques of this invention and run in a multi-instance fashion with great ease and efficiency.

Figure 9:
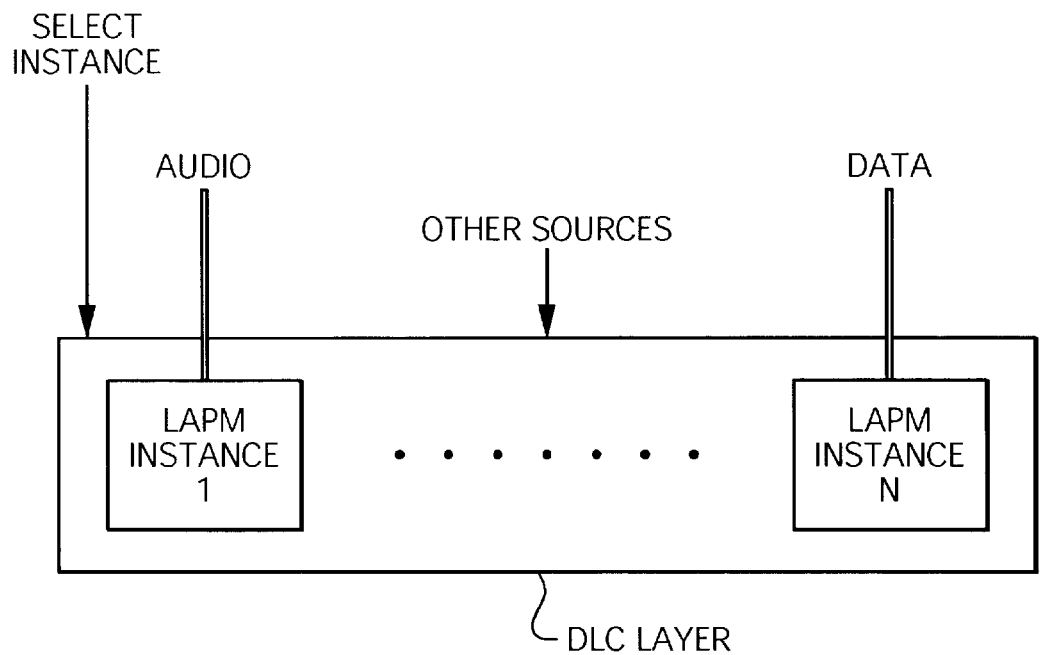
FIG. 9 is a diagram showing a multi-instanced DLC layer showing multiple instances of a line access protocol (LAPM).

FIG. 9 is a diagram showing a multi-instanced DLC layer showing multiple instances of a line access protocol (LAPM). The description given in conjunction with FIG. 8 really extends beyond DSVD (V.70) to an implementation, shown in FIG. 9, where any number of instances of the LAPM code can be run in the manner described. The other sources shown in FIG. 9 can include facsimile data, image data, text and any of the many data formats that might be sent. Thus, a large number of data sources can be accommodated with only one version of the LAPM code running.

Figure 10:
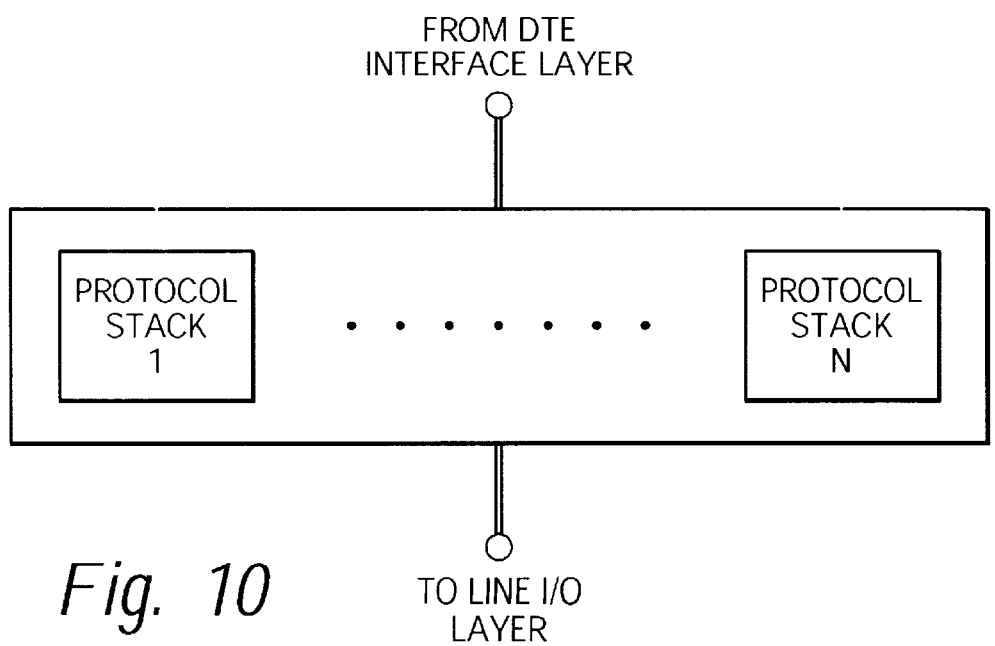
FIG. 10 is a diagram showing how multi-instanced software can be utilized to implement a plurality of protocol stacks which can be used simultaneously or independently in accordance with one embodiment of the invention.

FIG. 10 is a diagram showing how multi-instanced software can be utilized to implement a plurality of protocol stacks which can be used simultaneously or independently in accordance with one embodiment of the invention. As shown in FIG. 10, the entire protocol layer 310 can be replicated a number of times or, the protocol stack can be arranged so as to have a single instance of code which can select protocols and thus each instance of the protocol stack can reflect a different protocol. Thus, as shown in FIG. 10, by selecting a particular protocol stack instance, different protocols can be run substantially simultaneously with the management of the selection of the particular instance active at a given point in time specified by the global function or macro as discussed at 740.

Figure 11:
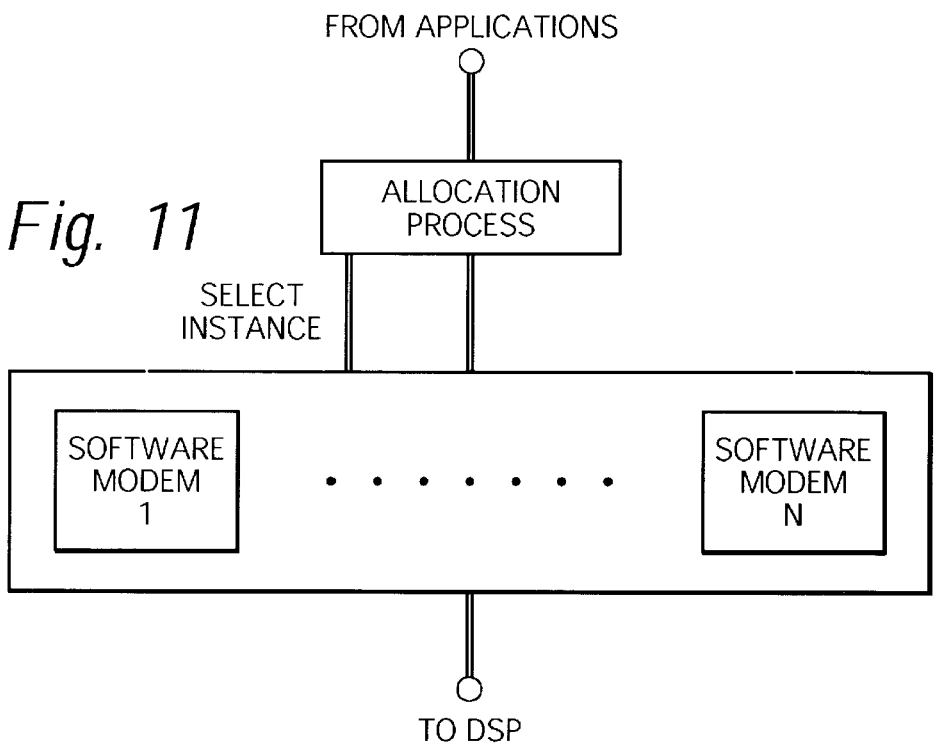
FIG. 11 is a diagram showing how multi-instanced software can be utilized to implement a plurality of modems which can be used simultaneously or independently in accordance with one embodiment of the invention.

FIG. 11 is a diagram showing how multi-instanced software can be utilized to implement a plurality of modems which can be used simultaneously or independently in accordance with one embodiment of the invention. Entire controllerless software modems (e.g. FIG. 3) can be made multi-instanced using the techniques described herein. Such a controllerless modem could contain components, such as the protocol layer, or the DLC layer which are themselves multi-instanced. As a result, one can implement a plurality of software modems as instances of a single code set. As a result, a manufacturer could manufacture and a consumer purchase essentially a plurality of software modems which are instances of a single code set and these could be activated by simply selecting the instance to be utilized at any given point in time. This enables one to effectively have a plurality of modems running substantially simultaneously (or independently), each having different characteristics. In some multiple modem configurations, multiple independent DSP chips may be required, depending on the design, interface, and processing capabilities of each DSP.

Figure 12:
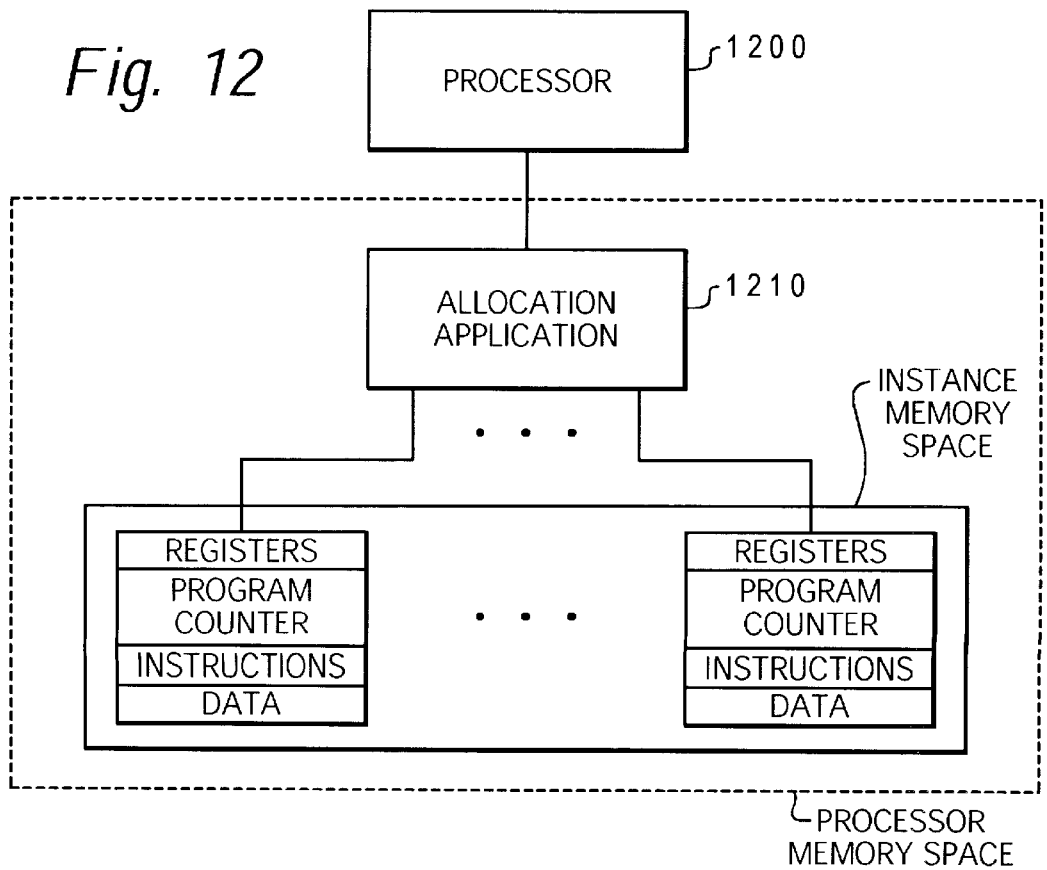
FIG. 12 is an illustration of a technique for enabling multi-tasking on a processor without operating system support and without a memory management unit in accordance with one embodiment of the invention.

There are certain instances in which a processor runs with essentially no operating system. Typically, this might occur in a special purpose device having an embedded processor. By writing an allocation routine (1210) to run on the processor 1200, a plurality of instances of a program structure, having, for example, registers, a program counter, instructions and data can be allocated, each to be selectively activated by the allocation application 1210. In one embodiment, the allocation application can be a simple time slice allocation round robin algorithm which gives each program instance its slice of processor time. Thus, an embedded processor which would otherwise be inherently single instance, can be made multi-instance by effectively implementing memory management in the manner described in FIG. 12. This would be particularly advantageous when using a processor which did not have a hardware memory management unit. One could simulate memory management functions even though the processor had no hardware memory management unit.

Figure 13:
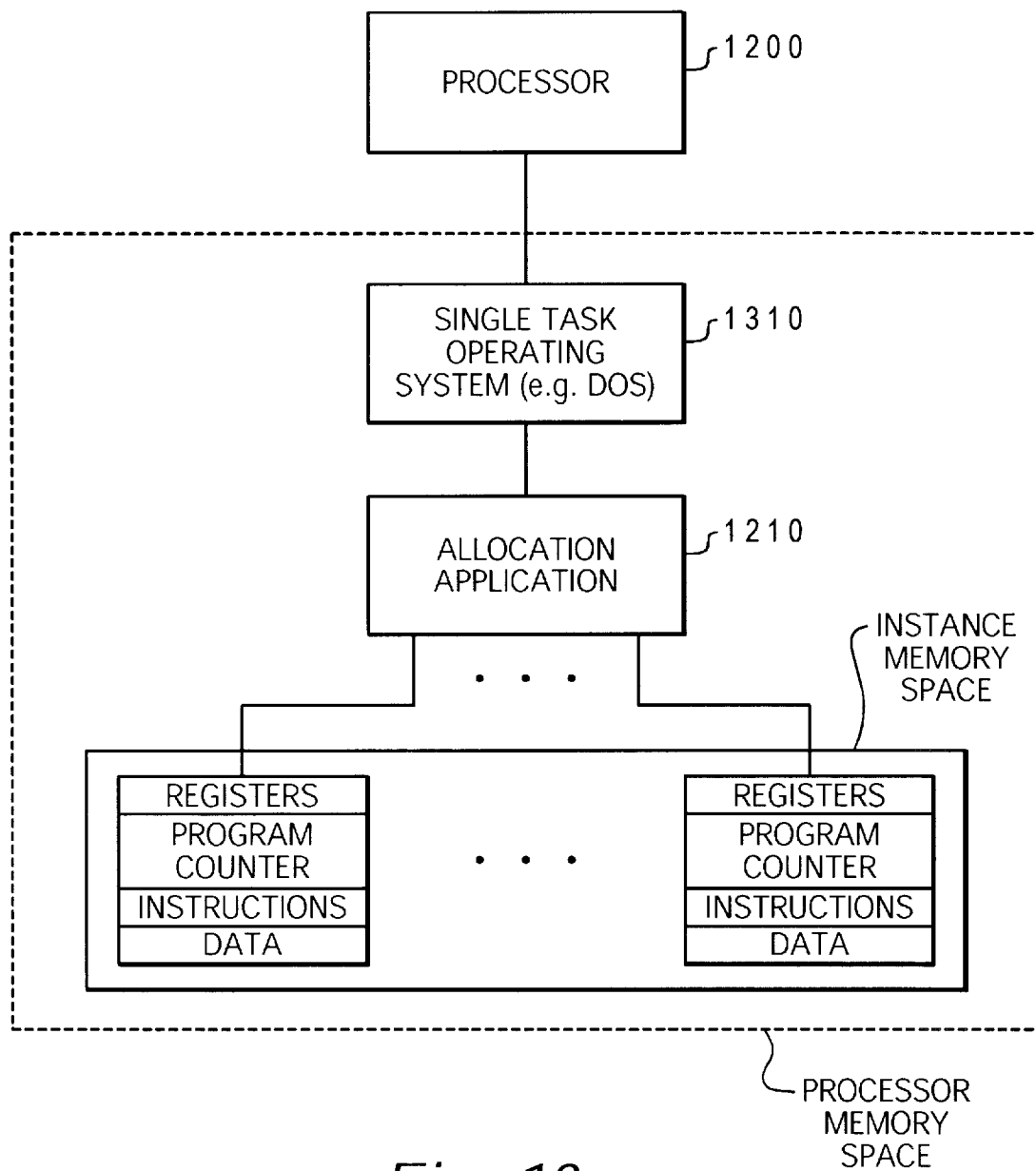
FIG. 13 is an illustration of a technique for enabling multi-tasking on a processor running a single task operating system.

FIG. 13 is an illustration of a technique for enabling multi-tasking on a processor running a single task operating system. Many operating systems, such as DOS, are essentially single task systems. That is, once an application is opened in DOS, typically no other application can run. By applying the techniques discussed in conjunction with FIG. 12 to a process running under DOS, what would otherwise be single instance software which can handle one task can be made multi-instanced (and therefore multi-task capable) and the power and functionality of the DOS operating system expanded beyond that which would otherwise be available.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. A method of creating multi-instantiated code from single instance code designed to run as only a single copy of a program on a data processing system, wherein the single instance code includes global data and references to variables which use at least some of the global data, comprising the steps of:
   a. moving all of the global data from said single instance code into an instance structure;
   b. allocating a plurality of instances of the instance structure;
   c. creating a global pointer to selectively point to one of said plurality of instances;
   d. converting references to variables in said single instance code to references to variables in an instance structure; and
   e. creating a process to control selection of the instance pointed to by said global pointer to specify a particular one of the allocated plurality of instances as being an active instance for a given time period, to allow multiple instances of said single instance code to be separately executed.

2. The method of claim 1 implemented in a pre-processor.

3. The method of claim 1 in which the step of moving includes pre-pending moved data names with an instance structure prefix.

4. The method of claim 1, in which the step of converting is done in a pre-processor macro.

5. The method of claim 1 in which said process to control selection of the instance is a function.

6. The method of claim 1 in which said process to control selection of the instance is a macro.

7. The method of claim 1 in which said process to control selection of the instance controls priority of activation of an instance.

8. A method of creating multi-instantiated code, comprising the step of sending software for converting single instance software into multi-instance software, according to the method of claim 1, from one computer across a network to another computer.

9. Apparatus for creating multi-instantiated code from single instance code, comprising:
   a. a computer, and
   b. a compiler configured to convert single instance software into multi-instance software, using said computer, to allow multiple instances of said single instance code to be separately executed, by creating a template data structure from which a plurality of instance data structures may be allocated, and maintaining a global pointer to specify a particular one of the allocated plurality of instance data structures as being an active instance for a given time period.

10. Apparatus of claim 8 in which said compiler includes a pre-processor, said pre-processor converting single instance software into multi-instance software.

11. A computer program product comprising:
   a. a memory medium; and
   b. a computer program stored on said memory medium, said computer program comprising instructions for converting single instance software into multi-instance software, to allow multiple instances of said single instance software to be separately executed, by creating a template data structure from which a plurality of instance data structures may be allocated, and maintaining a global pointer to specify a particular one of the allocated plurality of instance data structures as being an active instance for a given time period.

12. A modem, comprising:
   a. a processor;
   b. modem software designed to run as a single instance on the modem; and
   c. a plurality of instances of said modem software running on said processor which can be activated selectively by using a global pointer to specify a particular one of the plurality of instances as being an active instance for a given time period, to allow multiple instances of said modem software to be separately executed.

13. The modem of claim 12, in which an active instance is specified by setting a pointer.

14. A computer comprising:
   a. a processor;
   b. a single task operating system running on said processor;
   c. a first data structure containing a plurality of second data structures, each second data structure containing information about a respective software task; and
   d. an allocation process for setting a global pointer to select one of said plurality of second data structures to enable one of said respective software tasks to run under said single task operating system by providing an active association between the selected one of said plurality of second data structures and the one respective software task for a given period of time.

15. The computer of claim 14, in which said allocation process selects second data structures on a round robin basis.

16. A method of making a single task operating system into a multi-task operating system, comprising the steps of:
   a. creating a first data structure containing a plurality of second data structures, each second data structure containing information about a respective software task; and
   b. running an allocation process for selecting a second data structure to enable said respective software task to run under said single task operating system.

17. A method of creating multi-instantiated code from single instance code, comprising the steps of:
   a. moving all global data from said single instance code into an instance structure, said moving step including the step of pre-pending moved data names with an instance structure prefix;
   b. allocating a plurality of instances of the instance structure;
   c. creating a global pointer to selectively point to one of said plurality of instances;
   d. converting references to variables in said single instance code to references to variables in an instance structure; and
   e. creating a process to control selection of the instance pointed to by said global pointer.

* * * * *